United States Patent
Jeon et al.

(10) Patent No.: US 10,131,232 B2
(45) Date of Patent: Nov. 20, 2018

(54) METHOD FOR CONTROLLING BRAKING FORCE IN REGENERATIVE BRAKE COOPERATION CONTROL SYSTEM

(71) Applicant: Hyundai Motor Company, Seoul (KR)

(72) Inventors: Gab Bae Jeon, Gyeonggi-Do (KR); Sang Hyun Shim, Seoul (KR); Jae Il Choi, Gyeonggi-Do (KR); Yong Pil Kim, Incheon (KR)

(73) Assignee: Hyundai Motor Company, Seoul (KR)

( * ) Notice: Subject to any disclaimer, the term of this patent is extended or adjusted under 35 U.S.C. 154(b) by 139 days.

(21) Appl. No.: 15/365,128

(22) Filed: Nov. 30, 2016

(65) Prior Publication Data

US 2018/0086209 A1    Mar. 29, 2018

(30) Foreign Application Priority Data

Sep. 26, 2016    (KR) ........................ 10-2016-0122827

(51) Int. Cl.
| | |
|---|---|
| B60L 7/26 | (2006.01) |
| B60L 7/10 | (2006.01) |
| B60T 8/58 | (2006.01) |
| B60T 1/10 | (2006.01) |
| B60T 8/17 | (2006.01) |
| B60T 8/1766 | (2006.01) |

(52) U.S. Cl.
CPC ............... *B60L 7/26* (2013.01); *B60T 1/10* (2013.01); *B60T 8/17* (2013.01); *B60T 8/1766* (2013.01); *B60T 8/58* (2013.01); *B60L 2240/461* (2013.01); *B60L 2240/465* (2013.01); *B60T 2270/604* (2013.01)

(58) Field of Classification Search
CPC .. B60L 7/26; B60L 7/10; B60L 8/1766; B60L 8/58

See application file for complete search history.

(56) References Cited

U.S. PATENT DOCUMENTS

| | | | | |
|---|---|---|---|---|
| 2003/0062770 A1* | 4/2003 | Sasaki | ....................... | B60T 8/00 303/152 |
| 2004/0070270 A1* | 4/2004 | Gunji | ....................... | B60K 6/44 303/152 |

(Continued)

FOREIGN PATENT DOCUMENTS

| | | | |
|---|---|---|---|
| JP | 2007-126092 A | 5/2007 | |
| JP | 2007-209183 A | 8/2007 | |

(Continued)

*Primary Examiner* — Thomas J Williams
*Assistant Examiner* — James K Hsiao
(74) *Attorney, Agent, or Firm* — Mintz Levin Cohn Ferris Glovsky and Popeo, P.C.; Peter F. Corless

(57) ABSTRACT

A method for controlling braking force in a regenerative brake cooperation control system can maximally use regenerative braking force of a rear wheel simultaneously while improving vehicular braking stability by preventing the rear wheel from being locked earlier than a front wheel. The method includes controlling braking forces of the front wheel and the rear wheel by considering a distribution of total vehicular braking force including a coasting regenerative braking force in the regenerative brake cooperation control system in an eco-friendly vehicle which can perform regenerative braking in the rear wheel or both the front wheel and the rear wheel.

16 Claims, 3 Drawing Sheets

(56) References Cited

U.S. PATENT DOCUMENTS

| | | | | |
|---|---|---|---|---|
| 2004/0212245 | A1* | 10/2004 | Tsunehara | B60L 7/26 303/3 |
| 2006/0055240 | A1* | 3/2006 | Toyota | B60K 6/40 303/152 |
| 2006/0196712 | A1* | 9/2006 | Toyota | B60K 6/445 180/165 |
| 2009/0302673 | A1* | 12/2009 | Linhoff | B60L 7/26 303/3 |
| 2010/0113215 | A1* | 5/2010 | Jager | B60L 7/26 477/29 |
| 2010/0127562 | A1* | 5/2010 | Yokoyama | B60T 1/10 303/151 |
| 2010/0320011 | A1* | 12/2010 | Li | B60T 1/10 180/65.1 |
| 2011/0031804 | A1* | 2/2011 | Shimada | B60T 8/266 303/2 |

FOREIGN PATENT DOCUMENTS

| | | |
|---|---|---|
| JP | 2010-173420 A | 8/2010 |
| JP | 2012-157213 A | 8/2012 |
| KR | 10-0559332 | 6/2005 |
| KR | 10-2007-0062230 | 6/2007 |
| KR | 10-2014-0032703 A | 3/2014 |
| KR | 10-2016-0025401 A | 3/2016 |
| KR | 10-2016-0071850 A | 6/2016 |

* cited by examiner

METHOD FOR CONTROLLING BRAKING FORCE IN REGENERATIVE BRAKE COOPERATION CONTROL SYSTEM

CROSS-REFERENCE TO RELATED APPLICATION

This application claims under 35 U.S.C. § 119(a) the benefit of Korean Patent Application No. 10-2016-0122827 filed on Sep. 26, 2016, the entire contents of which are incorporated herein by reference.

BACKGROUND (a) Technical Field

The present disclosure relates to a method for controlling braking force in a regenerative brake cooperation control system, more particularly, to a method for controlling braking force of a front wheel and a rear wheel by considering regenerative braking force generated by coasting driving in the regenerative brake cooperation control system in an eco-friendly vehicle that can perform regenerative braking in the rear wheel.

(b) Description of the Related Art

In general, regenerative brake cooperation control in eco-friendly vehicles (a hybrid vehicle, an electric vehicle, a fuel cell vehicle, and the like) that perform regenerative braking in both a front wheel and a rear wheel is different from a situation of a vehicle that performs the regenerative braking only in the front wheel in the related art.

In an eco-friendly vehicle that performs only front-wheel regenerative braking, a drive motor is disposed in the front wheel, regenerative braking force is generated at the time of recovering energy by charging a battery in the drive motor, and the braking force is applied only to the front wheel. In this case, since a possibility that the vehicle will spin is low even though total braking force of the front wheel increases by the regenerative braking force of the front wheel, a regenerative braking force generation amount can be maximized in order to recover a maximum amount of energy. In addition, a system for cooperative control of hydraulic braking force (i.e., friction braking force) is also provided by considering only the regenerative braking force of the front wheel.

However, in the case of the eco-friendly vehicle that can perform the regenerative braking in both the front wheel and the rear wheel, since the regenerative braking force is applied even to the rear wheel, when the regenerative braking force of the rear wheel increases in order to recover significant energy, the rear wheel is locked earlier than the front wheel, and as a result, the possibility that the vehicle will spin increases. Therefore, there is a limitation in increasing the regenerative braking force like a front-wheel regenerative braking vehicle.

In the case where the regenerative braking force is present, which is generated when an acceleration pedal and a brake pedal are off (that is, during coasting driving of non-acceleration and non-braking situations), braking forces of regenerative braking when the acceleration pedal and the brake pedal are off, and the regenerative braking force and the friction braking force controlled by a brake controller are simultaneously applied to the vehicle.

Hereinafter, the regenerative braking force generated by the coasting driving will be referred to as a coasting regenerative braking force.

In this case, when the coasting braking force is not included and the braking forces of the front wheel and the rear wheel are distributed in the brake controller, there is a problem that it is possible that as the coasting regenerative braking force is included, the rear wheel braking force increases, and as a result, the rear wheel will be locked earlier than the front wheel increases.

The above information disclosed in this Background section is only for enhancement of understanding of the background of the disclosure and therefore it may contain information that does not form the prior art that is already known in this country to a person of ordinary skill in the art.

SUMMARY

The present disclosure provides a method for controlling braking force in a regenerative brake cooperation control system which can maximally use regenerative braking force of a rear wheel simultaneously while improving vehicular braking stability by preventing the rear wheel from being locked earlier than a front wheel by controlling braking forces of the front wheel and the rear wheel by considering a distribution of total vehicular braking force including coasting regenerative braking force of the rear wheel in an eco-friendly vehicle which can perform regenerative braking in the rear wheel or both the front wheel and the rear wheel.

In one aspect, the present disclosure provides a method for controlling braking force in a regenerative brake cooperation control system, including: a first step of distributing braking forces of a front wheel and a rear wheel, by a brake controller, so as to generate regenerative braking force for at least one of the front wheel and the rear wheel while vehicle deceleration is less than a reference deceleration while performing braking during coasting driving and distributing rear wheel braking force only up to a rear wheel limit braking force; and a second step of distributing the braking forces of the front wheel and the rear wheel, by the brake controller, according to a set braking force distribution ratio while vehicle deceleration is equal to or more than the reference deceleration.

In a preferred embodiment, in the first step, only a rear wheel regenerative braking force may be controlled to increase at initial braking and the rear wheel braking force constituted by the rear wheel regenerative braking force and coasting regenerative braking force may be controlled to increase only up to the rear wheel limit braking force. In addition, when the rear wheel braking force reaches the rear wheel limit braking force, the rear wheel braking force may be controlled to be maintained to the rear wheel limit braking force and the front wheel braking force is controlled to increase while vehicle deceleration is less than the reference deceleration. Further, in the case of the braking force distributed to the front wheel, only the front wheel regenerative braking force may be controlled to increase up to a maximum front wheel regenerative braking force, and thereafter, a front wheel friction braking force may be controlled to increase while vehicle deceleration is less than the reference deceleration.

In another preferred embodiment, in the first step, since the rear wheel limit braking force has the same value as the coasting regenerative braking force, the rear wheel braking force may be controlled to be maintained as the coasting regenerative braking force and only the front wheel braking force may be controlled to increase while vehicle deceleration is less than the reference deceleration. In this case, in the case of the braking force distributed to the front wheel, only the front wheel regenerative braking force may be first controlled to increase up to maximum front wheel regenerative braking force, and thereafter, the front wheel friction braking force may be controlled to increase.

In still another preferred embodiment, in the first step, the rear wheel braking force may be controlled to be maintained as the coasting regenerative braking force at the initial braking and only the front wheel regenerative braking force may be controlled to increase while vehicle deceleration is less than a first deceleration having a smaller value than the reference deceleration. In addition, only the rear wheel braking force may be controlled to increase while vehicle deceleration is equal to or more than the first deceleration and is less than a second deceleration and the second deceleration may have a value larger than the first deceleration and smaller than the reference deceleration. Further, in the case of the braking force distributed to the front wheel, while vehicle deceleration is equal to or more than the first deceleration and less than the second deceleration, only the front wheel regenerative braking force may be distributed to be maintained as the maximum front wheel regenerative braking force. Further, while vehicle deceleration is equal to or more than the second deceleration and less than the reference deceleration, the front wheel regenerative braking force may be controlled to be maintained as the maximum front wheel regenerative braking force and only the front wheel friction braking force may be controlled to increase. Moreover, while vehicle deceleration is equal to or more than the first deceleration and less than the second deceleration, in the case of the braking force distributed to the rear wheel only the rear wheel regenerative braking force may be controlled to increase. The rear wheel braking force constituted by the rear wheel regenerative braking force and the coasting regenerative braking force may be controlled to increase only up to the rear wheel limit braking force. Besides, when the rear wheel braking force reaches the rear wheel limit braking force, the rear wheel braking force may be maintained as the rear wheel limit braking force while vehicle deceleration is equal to or more than the second deceleration and less than the reference deceleration from the second deceleration.

In the second step, the front wheel braking force is distributed as a value of "$T_d * C_F/(C_F+C_R)+T_1*C_F/(C_F+C_R)$" and the rear wheel braking force is distributed as a value of "$T_d*C_R/(C_F+C_R)-T_1*C_F/(C_F+C_R)+T_1$", where $T_d$ represents the driver required braking force according to operating a brake pedal, T1 represents the coasting regenerative braking force, $C_F/(C_F+C_R)$ represents a front wheel braking force rate depending on the braking force distribution ratio of the distribution line 2 determined based on a barking system, and $C_R/(C_F+C_R)$ represents a rear wheel braking force rate depending on the braking force distribution ratio of the distribution line 2 determined based on a barking system.

In the second step, in the case of the braking force distributed to the rear wheel, the rear wheel regenerative braking force may increase up to the maximum rear wheel regenerative braking force, and thereafter, the rear wheel regenerative braking force may be controlled to be maintained as the maximum rear wheel regenerative braking force and only the rear wheel friction braking force may be controlled to increase.

In the case of the braking force distributed to the front wheel, the front wheel regenerative braking force may be maintained to the maximum front wheel regenerative braking force and only the front wheel friction braking force may be controlled to increase.

According to the present disclosure, a method for controlling braking force in a regenerative brake cooperation control system can maximally use regenerative braking force of a rear wheel simultaneously while securing vehicular braking stability by preventing the rear wheel from being locked earlier than a front wheel by controlling braking forces of the front wheel and the rear wheel by considering a distribution of total vehicular braking force including coasting regenerative braking force in distributing the braking forces of the front wheel and the rear wheel in an eco-friendly vehicle which can perform regenerative braking in the rear wheel or both the front wheel and the rear wheel, thereby achieving improvement in fuel efficiency by increasing an energy recovery amount by regenerative braking.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
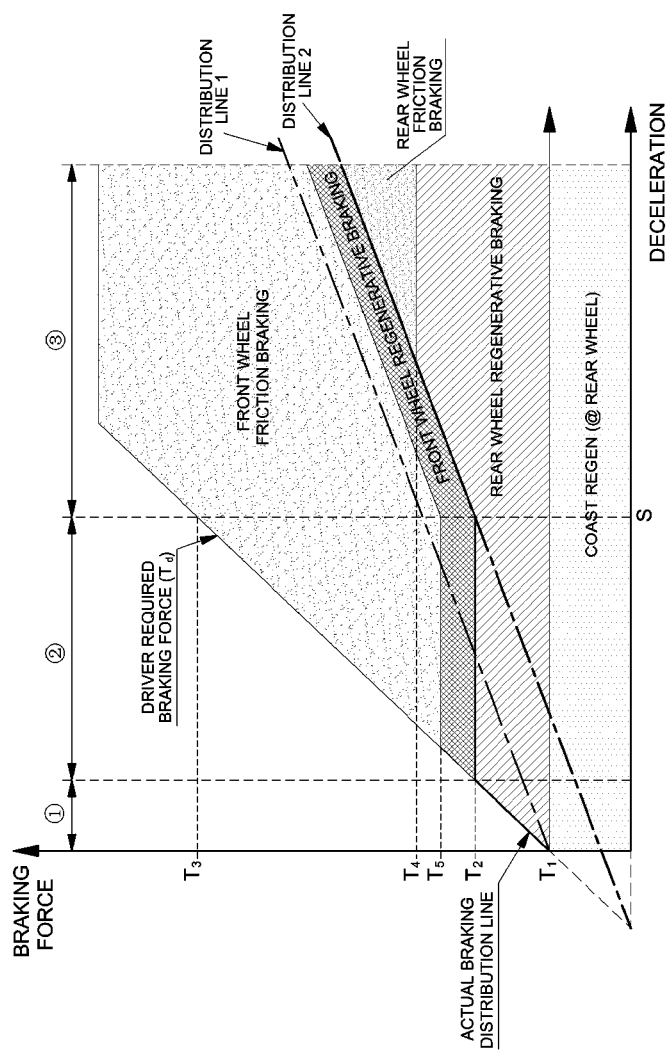
FIG. 1 is a conceptual view illustrating a method for controlling braking force according to an exemplary embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

The present disclosure relates to a method for controlling braking force in a new type of regenerative brake cooperation control system, which can achieve improvement of braking stability, performance, and fuel efficiency of an eco-friendly vehicle performing regenerative braking in a rear wheel or an eco-friendly vehicle (a hybrid vehicle, an electric vehicle, a fuel cell vehicle, and the like) performing the regenerative braking in both a front wheel and the rear wheel.

The method for controlling the braking force in the regenerative brake cooperation control system according to the present disclosure is a braking force control method that considers total braking force of a vehicle including braking force by regenerative braking (alternatively, referred to as 'coast regen') generated during coasting driving based on a brake system that may independently control the braking forces of the front wheel and the rear wheel in the eco-friendly vehicle performing the regenerative braking in the rear wheel or both the front wheel and the rear wheel, and secures braking stability and maximizes energy recovery rate by the regenerative braking to improve the fuel efficiency.

The brake system for implementing the method for controlling the braking force in the regenerative brake cooperation control system according to the present disclosure is an independent system, which may independently control friction braking forces of the front wheel and the rear wheel, performs cooperation of and control of the regenerative braking force and the friction braking force, and independently operates a brake pedal and generates the braking force (as one example, implemented by using a pedal simulator, and the like), and is configured to include a brake controller for controlling the friction braking force and the regenerative braking force.

The brake system is configured to obtain information on a coast regen generation amount (a generation amount of regenerative braking force generated during the coasting driving). For example, the brake system may be configured to include a system that may store predetermined coast regen generation amount information or additionally receive the coast regen generation amount information.

In the present specification, in addition to the brake system, a method for controlling braking force in a regenerative brake cooperation control system according to the present disclosure, which includes a braking force distribution method that appropriately distributes the regenerative braking forces and the friction braking forces of the front wheel and the rear wheel based on a vehicle controller controlling the coast regen generation amount, will be described.

In this regard, in the present specification, through a braking line of the accompanying drawing, an implementation example of the method for controlling braking force in a regenerative brake cooperation control system according to the present disclosure is intended to be described, but the disclosure thereof is not limited by the implementation example and should be construed to include various implementation examples embracing the gist of the present disclosure.

The brake system is used to distribute the braking forces of the front wheel and the rear wheel according to a braking line set to maximize the regenerative braking force within a range to restrict that the rear wheel is locked earlier than the front wheel.

Accordingly, according to a preferred implementation example of the present disclosure, when braking is performed during the coasting driving, the braking forces of the front wheel and the rear wheel are distributed so as to generate the regenerative braking force for at least one of the front wheel and the rear wheel and a reference deceleration is set, rear wheel braking force is distributed only up to rear wheel limit braking force so as to reduce the possibility that the rear wheel is locked earlier than the front wheel up to a braking region before the set reference deceleration, that is, until a deceleration of the vehicle reaches the reference deceleration, and the braking forces of the front wheel and the rear wheel are distributed according to a set braking force distribution ratio in a braking region of the reference deceleration or more.

Hereinafter, a method for controlling braking force in a regenerative brake cooperation control system according to the present disclosure will be described in detail with reference to the accompanying drawings.

Figure 2:
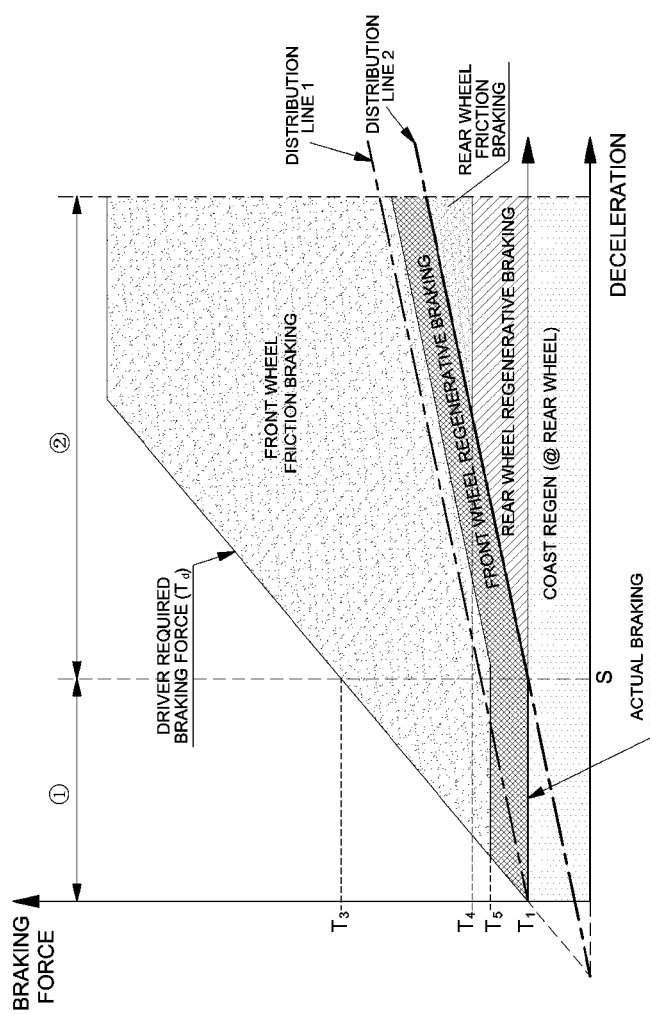
FIG. 2 is a conceptual view illustrating a method for controlling braking force according to another exemplary embodiment of the present disclosure.
Figure 3:
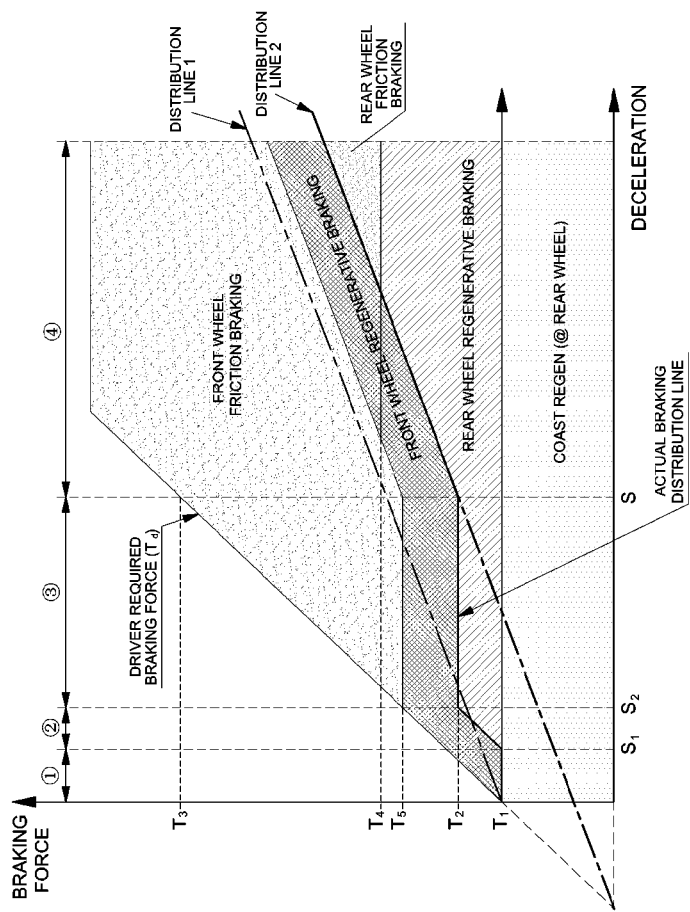
FIG. 3 is a conceptual view illustrating a method for controlling braking force according to yet another exemplary embodiment of the present disclosure.

FIGS. 1 to 3 which are accompanied as braking line diagrams for different implementation examples of the present disclosure using such a brake system, and which illustrate a distribution of total braking force including coast regen, show a braking force distribution relationship between a front wheel and a rear wheel in detail.

A normal brake controller performs braking force distribution of the front wheel and the rear wheel based on a distribution line 1 (a normal braking force distribution line having braking force T1 as a reference point) of FIGS. 1 to 3 without considering regenerative braking force generated by coasting driving.

A brake controller according to the present disclosure controls total vehicular braking force by considering the regenerative braking force additionally generated during the coasting driving at the time of controlling braking force by cooperation control of friction braking force and the regenerative braking force in a vehicle that performs regenerative braking in the rear wheel or a vehicle that performs the regenerative braking in both the front wheel and the rear wheel and controls the total vehicular braking force by performing braking force distribution of the front wheel and the rear wheel according to an actual braking distribution line and a distribution line 2 of FIGS. 1 to 3 in an implementation example of the present disclosure.

The distribution line 2 as a braking line diagram for braking force distribution for the total vehicular braking force including coasting regenerative braking force (regenerative braking force generated by coasting driving) is a line that distributes total braking force of the vehicle to the braking forces of the front wheel and the rear wheel with the same slope as the distribution line 1 in the related art.

A braking force distribution ratio of the distribution line 2 may be appropriately set for each vehicle by considering a design element of a brake unit for generating the braking force.

The actual braking distribution line is a braking line having the same braking force distribution ratio as the distribution line 2 in a braking region after a reference deceleration and having different braking force distribution ratios from the distribution line 2 in the braking region before the reference deceleration S based on the reference deceleration S, and the rate of the rear wheel braking force in the braking region before the reference deceleration S is set to be higher than the distribution line 2 by considering the regenerative braking force distributed to the rear wheel by the coasting driving.

That is, the actual braking distribution line as a braking line for distributing the total vehicular braking force including the regenerative braking force generated by the coasting driving has the same braking force distribution ratio as the distribution line 2 in the braking region after the reference deceleration S, relatively increases the rate of the rear wheel braking force as compared with the braking force distribution ratio of the distribution line 2 in the braking region before the reference deceleration S, and limits the rate to a predetermined range to improve braking stability by reducing a case where the rear wheel is locked earlier than the front wheel because the rear wheel braking force is larger and to improve fuel efficiency by using the regenerative braking force of the rear wheel as much as possible.

The reference deceleration S as a deceleration value at a point where the actual braking distribution line and the distribution line 2 cross each other is set to improve the braking stability by reducing a case where the rear wheel is locked earlier than the front wheel and to use the regenerative braking force of the rear wheel as much as possible by considering that the coasting regenerative braking force is distributed to the rear wheel.

In particular, the reference deceleration S is a deceleration at the time when total braking force of the rear wheel acquired by adding the coasting regenerative braking force and the rear wheel regenerative braking force and total braking force of the front wheel which are simultaneously generated at a predetermined ratio.

Herein, when a preferred implementation example of the present disclosure is described with reference to FIG. 1, in the case where a driver releases an acceleration pedal during driving and performs the coasting driving, a vehicle deceleration by coast regen (that is, regenerative braking performed by the coasting driving) generated by a vehicle controller which is a high controller of a brake controller is generated as a size value (a deceleration size value) increases until braking force reaches T1 and in this case, the brake controller does not control friction braking force and the regenerative braking force of the front wheel and the rear wheel.

The vehicle controller determines the braking force T1 generated by the regenerative braking during the coasting driving when an off signal of an acceleration pedal and the off signal of a brake pedal are detected.

Herein, a value of the regenerative braking force (generated as the regenerative braking force at the rear wheel) T1 generated by the coasting driving and a value of rear wheel limit braking force T2 for limiting the rear wheel braking force in the braking region before the reference deceleration S may be changed according to a situation.

The rear wheel limit braking force T2 is appropriately set to a value smaller than maximum rear wheel regenerative braking force in order to suppress a situation in which the rear wheel is locked earlier than the front wheel.

The coasting regenerative braking force may be determined not only by the vehicle controller but also by the brake controller.

When the driver steps on the brake pedal while releasing the acceleration pedal and performing the coasting driving, the brake controller distributes the braking forces of the front wheel and the rear wheel according to the actual braking distribution line.

In this case, according to the braking force distribution ratio of the actual braking distribution line, in section ① of FIG. 1, only the rear wheel regenerative braking force increases, in section ②, the rear wheel regenerative braking force is maintained without fluctuation and only the front wheel braking force increases, and in section ③, the braking forces of the front wheel and the rear wheel simultaneously increase.

In particular, in section ①, the rear wheel regenerative braking force is controlled to increase only up to the rear wheel limit braking force, and in section ②, the rear wheel regenerative braking force is maintained to rear wheel limit braking force and the front wheel braking force increases to control the braking force distributed to the front wheel so as to satisfy driver required braking force Td.

That is, after only the rear wheel regenerative braking force increases up to the rear wheel limit braking force in section ① at initial braking, the braking forces of the front wheel and the rear wheel are distributed so as to generate the front wheel braking force and in this case, the rear wheel regenerative braking force is controlled to be maintained to the rear wheel limit braking force and the front wheel braking force is controlled to increase so as to satisfy the driver required braking force Td. In addition, the braking force distributed to the front wheel is controlled so that the front wheel regenerative braking force increases up to the maximum front wheel regenerative braking force, and thereafter, is controlled so that the front wheel friction braking force increases.

Since the rear wheel braking force is constituted only by the rear wheel regenerative braking force and the regenerative braking force generated as a predetermined value by the coasting driving in section ①, the rear wheel braking force is distributed so as to increase the rear wheel regenerative braking force to reach the rear wheel limit braking force.

As described above, the brake controller distributes the braking force so as to maximally use the regenerative braking force in order to maximize an energy recovery amount by the braking within a braking force range of each of the front wheel and the rear wheel distributed according to the actual braking distribution line.

Meanwhile, regarding the braking force distribution for maximally using the regenerative braking force based on the brake controller, in other words, regarding the braking force distribution for maximally using the regenerative braking forces of the front wheel and the rear wheel except for the braking force by the coasting driving in the total vehicular braking force, the braking force at a deceleration time when section ① ends becomes T2-T1 and the braking force at the deceleration time when section ② ends becomes T3-T1 in FIG. 1.

In particular, the total braking force of the vehicle is T2 at the time when section ① ends, and in this case, the coasting regenerative braking force (the rear wheel regenerative braking force by the coasting driving) is T1, and the rear wheel regenerative braking force according to a driver's braking request is T2-T1, and as a result, the total vehicular braking force is determined as a value acquired by adding up the coasting regenerative braking force T1 and the rear wheel regenerative braking force T2-T1 according to the driver's braking request.

The total vehicular braking force at the time when section ② ends is T3 and in this case, the coasting regenerative braking force is T1, the rear wheel regenerative braking force according to the driver's braking request is T2-T1, the front wheel regenerative braking force according to the driver's braking request is T5-T2, and the front wheel friction braking force according to the driver's braking request is T3-T5. Therefore, the total vehicular braking force is determined as a value acquired by adding up the coasting regenerative braking force T1 and T3-T1 as the braking forces of the front wheel and the rear wheel according to the driver's braking request.

Accordingly, the driver required braking force Td at the time when section ① ends becomes T2-T1 and the driver required braking force Td at the time when section ② ends becomes T3-T1.

Herein, based on the friction braking force and the regenerative braking force of the front wheel and the rear wheel determined by the brake controller, in other words, based on the braking force T1 as the reference point so as to exclude the regenerative braking force generated by the coasting driving, the distribution of the braking forces of the front wheel and the rear wheel, and the friction braking forces and the regenerative braking forces of the front wheel and the rear wheel will be described below for each section.

Section ①: Td<T2-T1

Sections ①, ②, and ③ illustrated in FIG. 1 are sections where the braking force is distributed in a braking situation in which the driver steps on the brake pedal during the coasting driving, the time when section ① starts is a time when the driver starts braking by releasing the acceleration pedal and stepping on the brake pedal during the driving and the rear wheel braking force (that is, the rear wheel regenerative braking force) increases so as to satisfy the driver required braking force Td up to the time when section ① ends.

Accordingly, in this case, the front wheel braking force is '0' and the rear wheel braking force is Td.

Herein, the rear wheel regenerative braking force is controlled to increase by considering the rear wheel limit braking force (a rear wheel braking force limit value) for suppressing the rear wheel from being locked earlier.

Section ②: T2-T1<Td≤T3-T1

At the time when section ① ends, section ② starts and in section ②, the rear wheel braking force is maintained to the rear wheel regenerative braking force T2-T1 at the time when section ① ends and the front wheel braking force increases so as to satisfy the driver required braking force Td.

The driver required braking force Td is determined in proportion to a step amount of the brake pedal and uses the braking force T1 as the reference point.

Accordingly, in this case, the front wheel braking force becomes Td-(T2-T1) and the rear wheel braking force becomes T2-T1.

Herein, in order to maximize the regenerative braking force, only the front wheel regenerative braking force increases so as to satisfy the driver required braking force Td until the total braking force becomes T5, and thereafter, the front wheel braking force distribution to satisfy the driver required braking force Td is achieved by increasing the front wheel friction braking force.

Section ③: Td>T3-T1

In section ③, the front wheel braking force and the rear wheel braking force simultaneously increase and the braking forces of the front wheel and the rear wheel depending on the braking force distribution ratio of the actual braking distribution line and the distribution line 2 are distributed.

As illustrated in FIG. 1, after the vehicle deceleration reaches the reference deceleration S, the rear wheel regenerative braking force starts to increase again simultaneously when the front wheel friction braking force increases and when the rear wheel regenerative braking force reaches the maximum rear wheel regenerative braking force T4-T1, the braking force is distributed so as to generate the rear wheel friction braking force.

In other words, when the sum of the rear wheel regenerative braking force and the coasting regenerative braking force reaches T4, the braking force distribution is controlled so as to limit generation of the rear wheel regenerative braking force and satisfy the driver required braking force Td by increasing the rear wheel friction braking force.

In section ③, the braking force distributed to the front wheel is controlled as a value shown in Equation 1 given below and the braking force distributed to the rear wheel is controlled as a value shown in Equation 2 given below.

$$\text{Front wheel braking force} = T_d \cdot C_F/(C_F+C_R) + T_1 \cdot C_F/(C_F+C_R) \qquad \text{Equation 1}$$

$$\text{Rear wheel braking force} = T_d \cdot C_R/(C_F+C_R) - T_1 \cdot C_F/(C_F+C_R) \qquad \text{Equation 2}$$

Where, $T_d$ represents the driver required braking force, T1 represents the coasting regenerative braking force, $C_F$ represents a front wheel braking force factor, $C_R$ represents a rear wheel braking force factor, $C_F/(C_F+C_R)$ represents a front wheel braking force rate depending on the braking force distribution ratio of the distribution line 2, and $C_R/(C_F+C_R)$ represents a rear wheel braking force rate depending on the braking force distribution ratio of the distribution line 2.

The front wheel braking force factor $C_F$ and the rear wheel braking force factor $C_R$ may be appropriately set for each vehicle by considering design elements of the brake unit for generating the front wheel braking force and the braking unit for generating the rear wheel braking force, respectively.

The rear wheel braking force controlled as the value of Equation 2 given above is braking force distributed to the rear wheel with respect to the total vehicular braking force including the regenerative braking force generated by the coasting driving.

Consequently, regarding the braking force distribution of the front wheel and the rear wheel in terms of the total vehicular braking force, only the rear wheel regenerative braking force is controlled to increase at the initial braking, and as a result, the rear wheel braking force constituted by the rear wheel regenerative braking force and the regenerative braking force generated by the coasting driving is distributed to increase only up to the rear wheel limit braking force.

When the rear wheel braking force reaches the rear wheel limit braking force, the rear wheel braking force is controlled to be maintained to the rear wheel limit braking force and controlled so that the front wheel braking force increases up to the reference deceleration S.

In the case of the braking force distributed to the front wheel, only the front wheel regenerative braking force is first controlled to increase up to the maximum front wheel regenerative braking force and the front wheel regenerative braking force reaches the maximum front wheel regenerative braking force, and thereafter, the front wheel friction braking force is controlled to increase up to the reference deceleration S.

The braking forces of the front wheel and the rear wheel are distributed according to the braking force distribution ratio of the actual braking distribution line in the braking region of the reference deceleration S or more, and the braking force distributed to the front wheel is controlled as a value of $T_d*C_F/(C_F+C_R)+T_1*C_F/(C_F+C_R)$ and the braking force distributed to the rear wheel is controlled as a value of $T_d*C_R/(C_F+C_R)-T_1*C_F/(C_F+C_R)+T_1$.

In this case, in the case of the braking force distributed to the rear wheel, the rear wheel regenerative braking force increases up to the maximum rear wheel regenerative braking force, and thereafter, the rear wheel regenerative braking force is maintained to the maximum rear wheel regenerative braking force and the rear wheel friction braking force is controlled to increase.

In the case of the braking force distributed to the front wheel, the front wheel regenerative braking force is maintained to the maximum front wheel regenerative braking force and the front wheel friction braking force is controlled to increase.

Meanwhile, in the case where the regenerative braking force is limited or restricted at the time of distributing the braking forces of the front wheel and the rear wheel, two cases for distributing the braking force may be provided as follows.

First, when the driver required braking force Td≤the maximum rear wheel regenerative braking force T4-T1, '0' is distributed to the rear wheel friction braking force and a value T4-T1 acquired by subtracting the regenerative braking force T1 generated by the coasting driving from the driver required braking force Td is distributed to the front wheel friction braking force.

Consequently, the total vehicular braking force becomes the sum of the regenerative braking force generated by the coasting driving and the front wheel friction braking force.

Second, when the driver required braking force Td>the maximum rear wheel regenerative braking force T4-T1, the rear wheel friction braking force and the front wheel friction braking force are distributed as described below.

Rear wheel friction braking force=$[T_d-(T_4-T_1)]*C_R/(C_F+C_R)$

Front wheel friction braking force=$T_4-T_1+[T_d-(T_4-T_1)]*C_F/(C_F+C_R)$

Next, a method for distributing braking force according to another implementation example of the present disclosure will be described with reference to FIG. 2.

When vehicle braking stability is secured in spite of a decrease in energy recovery rate by the regenerative braking, the distribution of the braking force, the friction braking force and the regenerative braking force of the front wheel and the rear wheel may be controlled like a braking line illustrated in FIG. 2.

When the driver releases the acceleration pedal and performs driving by the coasting, the coasting regenerative braking force is controlled by the vehicle controller to be generated.

In this case, the value of the coasting regenerative braking force T1 may vary depending on a driving situation.

When the driver steps on the brake pedal during the coasting driving as described above, the brake controller distributes the braking forces of the front wheel and the rear wheel as described below based on a deceleration axis having the T1 as the reference point.

First, the brake controller distributes the braking forces of the front wheel and the rear wheel according to the braking force distribution ratio of the actual braking distribution line illustrated in FIG. 2 in section ① and distributes the braking forces of the front wheel and the rear wheel according to the braking force distribution ratio of the distribution line 2 in section ②.

Section ① and section ② are distinguished based on the reference deceleration S and the distribution line 2 has the braking force distribution ratio having the same value as the braking force distribution ratio of the actual braking distribution line in section ②.

In particular, in section ①, the rear wheel braking force is constantly maintained as the regenerative braking force T1 generated by the coasting driving and only the front wheel braking force increases until the vehicle deceleration reaches the reference deceleration S so as to satisfy the driver required braking force Td. In this case, the front wheel regenerative braking force is first controlled to increase up to the maximum front wheel regenerative braking force, and thereafter, the front friction braking force is controlled to increase.

In this case, in section ①, the braking force is more preferentially distributed for the braking stability rather than a case where a usage of the regenerative braking force increases, and as a result, separate rear wheel braking force is not distributed except for the regenerative braking force T1.

That is, in section ①, the rear wheel limit braking force has the same value as the regenerative braking force T1 generated by the coasting driving.

In section ②, both the braking forces of the front wheel and the rear wheel are controlled to increase and in this case, the rear wheel braking force is controlled so that the rear wheel regenerative braking force increases up to the maximum rear wheel regenerative braking force, and thereafter, the rear wheel regenerative braking force is maintained to the maximum rear wheel regenerative braking force and only the rear wheel friction braking force is controlled to increase.

In the case of the front wheel braking force, the front wheel regenerative braking force is maintained to the maximum front wheel regenerative braking force and only the front wheel friction braking force is controlled to increase.

The distribution of the braking force, the friction braking force, and the regenerative braking force of the front wheel and the rear wheel will be described below for each section.

When the driver required braking force Td is T3-T1 or less like section ①, which is a section until the vehicle deceleration reaches the reference deceleration S, '0' is distributed to the rear wheel braking force not including the coasting regenerative braking force T1 and the driver required braking force Td is distributed to the front wheel braking force.

Herein, the driver required braking force Td is generated in proportion to the step amount of the brake pedal and the braking force T1 is used as the reference point.

In this case, when the distribution of the total vehicular braking force including the coasting regenerative braking force T1 is considered, the rear wheel braking force in section ① becomes the coasting regenerative braking force T1 and the front wheel braking force becomes the driver required braking force Td.

When the driver required braking force Td is more than T3-T1 like section ② which is a section after the vehicle deceleration reaches the reference deceleration S, each of the front wheel braking force and the rear wheel braking force is distributed as follows.

Front wheel braking force=$T_d*C_F/(C_F+C_R)+T_1*C_F/(C_F+C_R)$

Rear wheel braking force=$T_d*C_R/(C_F+C_R)-T_1*C_F/(C_F+C_R)$

Where, $T_d$ represents the driver required braking force, T1 represents the regenerative braking force by the coast regen, $C_F$ represents a front wheel braking force factor, $C_R$ represents a rear wheel braking force factor, $C_F/(C_F+C_R)$ represents a front wheel braking force rate depending on the braking force distribution ratio of the distribution line 2, and $C_R/(C_F+C_R)$ represents a rear wheel braking force rate depending on the braking force distribution ratio of the distribution line 2.

In this case, in terms of the total vehicular braking force, the braking force distributed to the rear wheel is controlled as a value of $T_d*C_R/(C_F+C_R)-T_1*C_F/(C_F+C_R)+T_1$ including the coasting regenerative braking force T1.

Next, a method for distributing braking force according to yet another implementation example of the present disclosure will be described with reference to FIG. 3.

When the braking stability is complemented by limiting the rear wheel braking force in order to increase the energy recovery rate by maximally generating the rear wheel regenerative braking force within an available range and prevent the rear wheel from being locked earlier than the front wheel, the distribution of the braking force, the friction braking force, and the regenerative braking force of the front wheel and the rear wheel may be controlled like the braking line illustrated in FIG. 3.

Even when the braking force is distributed by the braking line illustrated in FIG. 1 described above, the above effect may be achieved.

In particular, according to the braking line illustrated in FIG. 3, the rear wheel is prevented from being locked earlier than the front wheel by generating and using the front wheel regenerative braking force earlier than the rear wheel regenerative braking force so as to secure the vehicle braking stability.

When the driver releases the acceleration pedal and performs driving by the coasting, the coasting regenerative braking force T1 is controlled by the vehicle controller to be generated.

In this case, the values of the regenerative braking force T1 distributed to the rear wheel by the coasting driving and the rear wheel limit braking force T2 for limiting the rear wheel braking force may vary depending on the driving situation.

When the driver steps on the brake pedal during the coasting driving as described above, the brake controller distributes the braking forces of the front wheel and the rear wheel as described below by using the T1 as the reference point (alternatively, a start point).

First, the brake controller distributes the braking forces of the front wheel and the rear wheel according to the braking force distribution ratio of the actual braking distribution line illustrated in FIG. 3 in sections ①, ②, and ③ before the reference deceleration S and distributes the braking forces of the front wheel and the rear wheel according to the braking force distribution ratio of the distribution line 2 in section ④ after the reference deceleration S.

Sections ①, ②, and ③ and section ④ are distinguished based on the reference deceleration S and the distribution line 2 has the braking force distribution ratio having the same value as the braking force distribution ratio of the actual braking distribution line in section ④.

In particular, in section ① at the initial braking, the rear wheel braking force is maintained as the coasting regenerative braking force T1 until the vehicle deceleration reaches a first deceleration S1 and only the front wheel braking force increases so as to satisfy the driver required braking force Td. In this case, the front wheel braking force is distributed so as to increase only the front wheel regenerative braking force and the front wheel friction braking force is not distributed.

In section ① where the braking starts, the rear wheel is prevented from being locked earlier than the front wheel by generating the front wheel regenerative braking force earlier than the rear wheel regenerative braking force so as to secure the vehicle braking stability.

In section ② where the vehicle deceleration is equal to or more than the first deceleration S1 and less than the second deceleration S2, the braking force of the rear wheel is controlled to increase and in this case, the braking force distributed to the rear wheel is controlled so that only the rear wheel regenerative braking force increases up to the second deceleration S2 and the rear wheel friction braking force is not distributed. In addition, in the case of the braking force distributed to the front wheel, only the front wheel regenerative braking force is generated to be controlled to be maintained as the maximum front wheel regenerative braking force which maximally increases in section ① and the front wheel friction braking force is not distributed.

In this case, the rear wheel braking force becomes the value T2 acquired by adding up the rear wheel regenerative braking force T2-T1 which increases up to the second deceleration S2 and the coasting regenerative braking force T1.

That is, in section ②, the rear wheel braking force is controlled to increase only up to the rear wheel limit braking force T2.

In section ③ where the vehicle deceleration is equal to or more than the second deceleration S2 and less than the reference deceleration S, the rear wheel braking force is controlled to be maintained as the value of the rear wheel limit braking force T2 and only the front wheel braking force is controlled to increase up to the reference deceleration S so as to satisfy the driver required braking force Td. In this case, the front wheel braking force is controlled so that only the front wheel friction braking force increases from the second deceleration S2 up to the reference deceleration S and the front wheel regenerative braking force is controlled to be maintained as the maximum front wheel regenerative braking force subsequently to section ②.

Herein, the second deceleration S2 is a deceleration value having a smaller value than the reference deceleration S and the first deceleration S1 is a deceleration value having a smaller value than the second deceleration S2.

The braking forces of the front wheel and the rear wheel are controlled to simultaneously increase in section 4 where the vehicle deceleration is equal to or more than the reference deceleration S. In particular, in the case of the braking force distributed to the rear wheel, the rear wheel regenerative braking force is controlled to increase up to the maximum rear wheel regenerative braking force and when the rear wheel regenerative braking force reaches the maximum rear wheel regenerative braking force, the rear wheel friction braking force is controlled to increase to satisfy the braking force distribution ratio of the distribution line 2 and the actual braking distribution line. In addition, in the case of the braking force distributed to the front wheel, the front wheel regenerative braking force is controlled to be maintained as the maximum front wheel regenerative braking force and only the front wheel friction braking force is controlled to increase subsequently to section ③ to satisfy the braking force distribution ratio of the distribution line 2 and the actual braking distribution line.

In this case, when the distribution of the total vehicular braking force including the coasting regenerative braking force T1 is considered, the rear wheel braking force becomes a value acquired by adding up all of the rear wheel regenerative braking force and the rear wheel friction braking force distributed according to the braking force distribution ratio of the distribution line 2 and the actual braking distribution line and the T1 in section ④.

In particular, in section ④, the front wheel braking force is distributed as a value of "$T_d*C_F/(C_F+C_R)+T1*C_F/(C_F+C_R)$" and the rear wheel braking force is distributed as a value of "$T_d*C_R/(C_F+C_R)-T_1*C_F/(C_F+C_R)+T_1$".

In respect to the distribution of the friction braking force and the regenerative braking force, the braking force distribution is achieved, in which the regenerative braking forces of the front wheel and the rear wheel are distributed up to maximum values, respectively in order to maximize the energy recovery amount by the regenerative braking, and thereafter, the friction braking force is distributed to satisfy the driver required braking force Td.

As described above, the present disclosure can maximally use regenerative braking force of a rear wheel simultaneously while securing vehicular braking stability by preventing the rear wheel from being locked earlier than a front wheel by controlling braking forces of the front wheel and the rear wheel by considering a distribution of total vehicular braking force including the regenerative braking force generated by the coasting driving in distributing the braking forces of the front wheel and the rear wheel in an eco-friendly vehicle which can perform regenerative braking in the rear wheel or both the front wheel and the rear wheel, thereby achieving improvement of fuel efficiency.

Meanwhile, since the regenerative braking force generated by an actual vehicle may vary depending on a vehicle velocity, the regenerative braking force may be different from the regenerative braking force determined by the brake controller as described in the aforementioned implementation example.

Accordingly, in respect to the regenerative braking force which may be actually generated in a vehicle which is driven, that is, a regenerative braking allowable amount, a smaller value of the rear wheel braking force and maximum rear wheel regenerative braking torque (that is, a maximum rear wheel regenerative braking force value) determined by a maximum rear wheel regenerative braking torque map is determined as a rear wheel regenerative braking allowable amount and a smaller value of the front wheel braking force and maximum front wheel regenerative braking torque (that is, a maximum front wheel regenerative braking force value) determined by a maximum front wheel regenerative braking torque map is determined as a front wheel regenerative braking allowable amount.

In this case, when the regenerative braking force (that is, the regenerative braking allowable amount) actually generated by the vehicle is smaller than the front wheel braking force and/or the rear wheel braking force distributed by the brake controller, insufficient braking force is controlled to be supplemented by each of the front wheel friction braking force and the rear wheel friction braking force.

The maximum rear wheel regenerative braking torque map and the maximum front wheel regenerative braking torque map which are constructed to determine the maximum rear wheel regenerative braking torque and the maximum front wheel regenerative braking torque, respectively based on the vehicle velocity are configured to determine the maximum rear wheel and the front wheel regenerative braking torques depending on the vehicle velocity, respectively to be stored in the brake controller.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A method for controlling braking force in a regenerative brake cooperation control system, the method comprising:
a first step of distributing braking forces of a front wheel and a rear wheel, by a brake controller, so as to generate regenerative braking force for at least one of the front wheel and the rear wheel while vehicle deceleration is less than a reference deceleration while performing braking during coasting driving and distributing rear wheel braking force only up to a rear wheel limit braking force; and
a second step of distributing the braking forces of the front wheel and the rear wheel, by the brake controller, according to a set braking force distribution ratio while vehicle deceleration is equal to or more than the reference deceleration.

2. The method of claim 1, wherein in the first step, only a rear wheel regenerative braking force is controlled to increase at initial braking and the rear wheel braking force constituted by the rear wheel regenerative braking force and coasting regenerative braking force is controlled to increase only up to the rear wheel limit braking force.

3. The method of claim 2, wherein in the first step, when the rear wheel braking force reaches the rear wheel limit braking force, the rear wheel braking force is controlled to be maintained to the rear wheel limit braking force and the front wheel braking force is controlled to increase while vehicle deceleration is less than the reference deceleration.

4. The method of claim 3, wherein in the first step, in a case of the braking force distributed to the front wheel, only the front wheel regenerative braking force is controlled to increase up to a maximum front wheel regenerative braking force, and thereafter, a front wheel friction braking force is controlled to increase while vehicle deceleration is less than the reference deceleration.

5. The method of claim 1, wherein in the first step, the rear wheel braking force is controlled to be maintained as a coasting regenerative braking force, and only the front wheel braking force is controlled to increase while vehicle deceleration is less than the reference deceleration.

6. The method of claim 5, wherein in the first step, in a case of the braking force distributed to the front wheel, only a front wheel regenerative braking force is first controlled to increase, and thereafter, a front wheel friction braking force is controlled to increase.

7. The method of claim 5, wherein the rear wheel limit braking force of the first step has a same value as the coasting regenerative braking force.

8. The method of claim 1, wherein in the first step, the rear wheel braking force is controlled to be maintained as a coasting regenerative braking force at initial braking and only a front wheel regenerative braking force is controlled to increase while vehicle deceleration is less than a first deceleration having a smaller value than the reference deceleration.

9. The method of claim 8, wherein only the rear wheel braking force is controlled to increase while vehicle deceleration is equal to or more than the first deceleration and is less than a second deceleration and the second deceleration has a value larger than the first deceleration and smaller than the reference deceleration.

10. The method of claim 9, wherein in a case of the braking force distributed to the front wheel, while vehicle deceleration is equal to or more than the first deceleration and less than the second deceleration, only the front wheel regenerative braking force is distributed to be maintained as a maximum front wheel regenerative braking force.

11. The method of claim 10, wherein while vehicle deceleration is equal to or more than the second deceleration and less than the reference deceleration, the front wheel regenerative braking force is controlled to be maintained as the maximum front wheel regenerative braking force and only a front wheel friction braking force is controlled to increase.

12. The method of claim 9, wherein while vehicle deceleration is equal to or more than the first deceleration and less than the second deceleration, in a case of the braking force distributed to the rear wheel, only the rear wheel regenerative braking force is controlled to increase, and the rear wheel braking force constituted by the rear wheel regenerative braking force and the coasting regenerative braking force is controlled to increase only up to the rear wheel limit braking force.

13. The method of claim 12, wherein when the rear wheel braking force reaches the rear wheel limit braking force, the rear wheel braking force is maintained as the rear wheel limit braking force while vehicle deceleration is equal to or more than the second deceleration and less than the reference deceleration.

14. The method of claim 1, wherein in the second step, in a case of the braking force distributed to the rear wheel, a rear wheel regenerative braking force increases up to a maximum rear wheel regenerative braking force, and thereafter, the rear wheel regenerative braking force is controlled to be maintained as the maximum rear wheel regenerative braking force and only a rear wheel friction braking force is controlled to increase.

15. The method of claim 1, wherein in the second step, in a case of the braking force distributed to the front wheel, a front wheel regenerative braking force is controlled to be maintained as a maximum front wheel regenerative braking force and only a front wheel friction braking force is controlled to increase.

16. The method of claim 1, wherein in the second step, the front wheel braking force is distributed as a value of "$T_d*C_F/(C_F+C_R)+T_1*C_F/(C_F+C_R)$" and the rear wheel braking force is distributed as a value of "$Td*C_R/(C_F+C_R)-T_1*C_F/(C_F+C_R)+T_1$", wherein Td represents a driver required braking force, T1 represents a coasting regenerative braking force, $C_F/(C_F+C_R)$ represents a front wheel braking force rate depending on a braking force distribution ratio of a distribution line, and $C_R/(C_F+C_R)$ represents a rear wheel braking force rate depending on the braking force distribution ratio of the distribution line.

* * * * *